… (Cl. 260—874)

United States Patent Office 3,373,226
Patented Mar. 12, 1968

3,373,226
POLYMERIC FILMS COMPRISING A POLYPHEN-
YLENE OXIDE AND BLENDS THEREOF WITH
POLYSTYRENE
Alastair C. Gowan, Pittsfield, Mass., assignor to General
Electric Company, a corporation of New York
No Drawing. Filed Aug. 2, 1965, Ser. No. 476,650
21 Claims. (Cl. 260—874)

This invention relates to ductile, craze resistant films formed from either a polyphenylene oxide or a blend of a polyphenylene oxide and a polystyrene and to a process for their formation.

Plastic films have found wide commercial acceptance within the last few years for a variety of uses including packaging, capacitors, cable wrap, raincoats, and the like.

In copending U.S. patent application, Ser. No. 427,237 filed Jan. 25, 1965, now abandoned, there is disclosed polymer film formed from a polyphenylene oxide or a blend of a polyphenylene oxide with polystyrene. This film possesses outstanding mechanical and electrical properties over a wide temperature range, but its use is somewhat impaired due to its limited resistance to solvent attack. I have now unexpectedly found that the solvent resistance of this film, as well as its ductility, can be substantially increased by the process of the present invention which includes the steps of subjecting the film to a treatment to induce cross-linking, contacting the cross-linked film with a dilatant to cause swelling without dissolution of the film and drying the film while it is secured in a swollen configuration. The film resulting from this process has increased solvent resistance and ductility, and also substantially retains its outstanding mechanical and electrical properties over a wide temperature range. This is highly unexpected as cross-linking frequently causes embrittlement and losses in physical properties such as tensile strength, elongation, etc.

Accordingly, one object of this invention is to provide a ductile, craze resistant polyphenylene oxide film.

Other objects and advantages of this invention will be in part apparent and in part pointed out in the description which follows.

Briefly stated, the objects and advantages of this invention are accomplished by subjecting a film formed from a polyphenylene oxide or a blend of a polyphenylene oxide and a polystyrene to cross-linking and thereafter, subjecting the cross-linked film to the action of a dilatant to cause the cross-linked film to swell, but not dissolve. Thereafter, the swollen film is secured and dried. Cross-linking can be induced through either oxidation of the film or by exposure to a source of high energy radiation.

The expression "polyphenylene oxide" as used throughout this disclosure and in the claims is meant to include the polymers described and claimed in U.S. Patents 3,-306,874 and 3,306,875 to Allan S. Hay, and incorporated herein by reference. The polyphenylene oxides may be represented in a preferred embodiment by the following general formula:

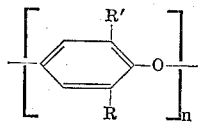

wherein the oxygen atom of one repeating unit is connected to the phenylene nucleus of the next repeating unit, R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of a tertiary α-carbon atom, and halohydrocarbonoxy radicals having at least two carbon atoms between the halogen atom and phenol nucleus and being free of a tertiary α-carbon atom; R' is the same as R and may additionally be a halogen; and $n$ may represent any whole integer greater than 100.

Typical examples of the monovalent hydrocarbon radicals that R and R' may be in the above formula are: alkyl, including cycloalkyl, e.g., methyl, ethyl, propyl, butyl, secondary butyl, cyclobutyl, amyl, cyclopentyl, hexyl, cyclohexyl, methylcyclohexyl, ethylcyclohexyl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3-bromoallyl, 2- and 3-fluoropropargyl, mono-, di-, tri-, tetra-, and pentachlorophenyl, mono-, di-, tri-, and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, butoxy, secondary butoxy, amoxy, hexoxy, octoxy, decoxy, vinoxy, alloxy, butenoxy, propargoxy, phenyloxy, toloxy, ethylphenoxy, naphthoxy, methylnaphthoxy, benzoxy, phenylethoxy, phenylpropoxy, tolylethoxy, etc. The monovalent halohydrocarbonoxy radicals may be the same as the above oxyhydrocarbonoxy, except methoxy and α-haloalkoxy radicals, where one of the hydrogens are replaced by a halogen, i.e., fluorine, chlorine, bromine, or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy, 2-, 3-, 4-, and 5-fluoroamoxy, 2-chlorovinoxy, 2- and 3-bromoalloxy, 2- and 3-fluoropropargoxy, mono-, di-, tri-, and tetrabromotoloxy, chloroethylphenoxy, ethylchlorophenoxy, iodoxyloxy, chloronaphthoxy, bromobenzoxy, chlorophenylethoxy, phenylchloroethoxy, bromotolylethoxy, etc.

Typical examples of polyphenylene oxides which may be employed in the process of this invention are: poly-(2,6-dimethyl-1,4-phenylene)-oxide, poly - (2,6 - diethyl-1,4-phenylene) - oxide, poly-(2,6-dibutyl-1,4-phenylene)-oxide, poly - (2,6 - dilauryl-1,4 phenylene)-oxide, poly-(2,6 - dipropyl - 1,4 - phenylene) - oxide, poly - (2,6-diphenyl-1,4-phenylene)-oxide, poly - (2,6 - dimethoxy-1,4-phenylene)-oxide, poly-(2,6-diethoxy - 1,4 - phenylene)-oxide, poly-(2-methoxy-6-ethoxy - 1,4 - phenylene)-oxide, poly-[2,6-di-(chlorophenoxy) - 1,4 - phenylene]-oxide, poly-[2,6-di-(chlorethyl) - 1,4 - phenylene]-oxide, poly-(2-methyl-6-isobutyl-1,4-phenylene) - oxide, poly-(2,6-ditolyl-1,4-phenylene) - oxide, poly-[2,6-di-(chloropropyl)-1,4-phenylene]-oxide, etc.

The polyphenylene oxides may be prepared in various ways. One method comprises oxidizing a phenol represented by the formula:

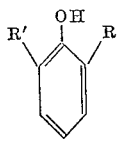

where R and R' have the same meanings given above. These phenols are oxidized by passing an oxygen-containing gas through the particular phenol in the presence of a catalyst system comprising a cuprous salt and a tertiary amine. More specific directions for preparing these polyphenylene ethers as well as examples of starting materials and polymers prepared therefrom are disclosed and claimed in the copending application of Allan S. Hay reference above.

The polystyrene materials which are employed in the practice of my invention are polymers of a substituted or unsubstituted styrene. Such styrenes may be represented by the following general formula:

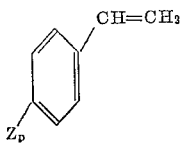

where Z is a member selected from the class consisting of halogen (e.g., chlorine, bromine, fluorine, etc.), an alkyl radical (e.g., methyl, ethyl, propyl, isopropyl, butyl, octyl, etc.), alkoxy (e.g., methoxy, ethoxy, propoxy, isopropoxy, butoxy, etc.), and $p$ is a whole number equal to from 0 to 3. Preferably, the starting monomer comprises styrene.

For brevity, the term "polyphenylene oxide" as used throughout this application will include not only unsubstituted polyphenylene oxide (made from phenol) but also polyphenylene oxide substituted with various substituents (e.g., those for which R and R' stand, above). The term "polystyrene" will include polystyrenes made from both unsubstituted styrene and also styrene substituted with various substituents (e.g., those for which Z stands, above, as well as copolymers of styrene of the above formula).

As in my above-noted copending application, the polystyrene content may range between 0 and 75 percent, by weight, of the total composition; however, a range of 1 to 35 percent polystyrene in polyphenylene oxide constitutes a preferred range for purposes of the present invention.

The ductile, craze resistant film of this invention is prepared by a process including the following steps: (1) forming a film of a polyphenylene oxide or a blend of a polyphenylene oxide and a polystyrene in accordance with art recognized techniques such as solvent casting, extrusion, etc.; (2) subjecting this film to a treatment which induces cross-linking of the polymers; (3) contacting the film with a dilatent to cause the film to swell without dissolving; (4) securing the film in its swollen configuration; and (5) removing the dilatant.

The manner of forming the polymer film initially does not constitute a part of this invention. If the film is solvent cast, the polymer, whether it be a polyphenylene oxide alone or a mixture of a polyphenylene oxide and a polystyrene, is dissolved in a solvent. Typical solvents include benzene, chloroform, toluene, xylene, dichloroethylene, trichloroethylene, nitrobenzene, thiophene, etc. Thereafter, the solution is cast on a suitable surface, the solvent is driven off and the film recovered.

Cross-linking of the film can be accomplished by either oxidizing the film or by exposing it to a source of high energy radiation. Cross-linking by oxidation is induced by subjecting the film to an oxidizing atmosphere such as air or oxygen at elevated temperatures. The period of time necessary to oxidize the film is, of course, dependent upon the temperature employed. The polyphenylene oxides retain their excellent physical properties over a wide temperature range and temperatures as high as 350° C. may be employed. However, in a preferred embodiment, exposure temperatures range between 200 and 275° C. The time of exposure may vary between 15 minutes and 6 hours.

An alternative procedure for cross-linking by oxidation would be to incorporate an oxidizing agent directly into the film. This can be accomplished by dissolving an oxidizing agent in a solvent along with the polyphenylene oxide and polystyrene. Thereafter, the solvent is removed leaving behind a film of polymer with an oxidizing agent distributed therein. The film is then exposed to elevated temperatures for short periods of time to accelerate the oxidation.

A third method for inducing cross-linking by oxidation comprises a combination of the two above methods. Accordingly, an oxidizing agent is coated onto a film sample and the film thereafter exposed to elevated temperatures in an oxidizing atmosphere.

An additional procedure for inducing cross-linking comprises subjecting the polymeric film to a source of high energy radiation in the presence of an oxidizing atmosphere. Such radiation is preferably in the ultraviolet or X-ray range and a total dosage in excess of 50 mega roentgens and preferably 100 is desirable.

Following the step of cross-linking, the film is exposed to a dilatant to cause the film to swell, but not dissolve. The swelling should cause the film to substantially increase in all of its dimensions. An increase in all dimensions of at least 50 percent is required, and preferably, the increase should exceed 100 percent. Suitable dilatants include those liquids which are normally solvents for linear polyphenylene oxides free of cross-linking. Dilatants that may be used include, but are not limited to, chloroform, methylenechloride, benzene, toluene, nitrobenzene, thiophene, xylene, dichloroethylene, trichloroethylene, etc. The time of immersion in the organic liquid is dependent upon the liquid employed and may vary between a few seconds and 2 hours and, in a preferred embodiment, should range between 2 and 100 seconds.

After the film has been swollen by the action of the dilatant, it is dried. During the drying operation, it is necessary to secure the edges of the film to prevent shrinkage. By following this procedure, the resultant film is biaxially oriented. This procedure eliminates the necessity of an additional step of stretch orienting. However, if desired, the film may be subsequently stretch oriented using the procedures set forth in my above-referenced copending patent application.

The following examples are illustrative of the various aspects of the present invention, but are not to be construed as limiting. All percentages expressed in the examples are by weight.

EXAMPLE 1

A film of poly-(2,6-dimethyl-1,4-phenylene)-oxide was employed. The film was prepared by extruding pellets of the polyphenylene oxide at a temperature of approximately 300° C. The film thickness was about 4½ mils. A sample measuring 3″ x 3″ was cut from the extruded film. This was placed in an air circulating oven maintained at 200° C. for 6 hours. Thereafter, the film was cooled and immersed in chloroform for approximately one minute. The film did not dissolve but it did swell to a final dimension of 4½″ x 5″. No attempt was made to measure the film thickness.

After removal from the chloroform and while in the swollen condition, the film sample was taped to a glass plate and dried at room temperature for 30 minutes and then dried in an air circulating oven maintained at 125° C. for 3 hours.

EXAMPLE 2

A film of poly-(2,6-dimethyl-1,4-phenylene)-oxide was used in this example. The film was prepared by extruding pellets of the polyphenylene oxide at a temperature of 300° C. The film thickness was approximately 4 to 5 mils. Three samples measuring 3″ x 3″ were prepared. One was maintained as a standard and the other two were cross-linked by placing them in an air circulating oven maintained at 200° C. for 3 hours. Thereafter, one of the two cross-linked films was immersed in chloroform for approximately one minute. The film did not dissolve but did swell to a final dimension of 5½″ x 7½″. No attempt was made to measure the thickness of the film in the swollen state. After removal from the chloroform and while in the swollen condition, the film sample was taped to a glass plate and dried at room temperature for 30 minutes followed by drying in an air circulating oven maintained at 125° C. for 3 hours. The final dimensions of the film were 5½″ x 7½″. Thus, the film was stretched well beyond its original dimensions.

The tensile and elongation properties of the three film samples were measured and the following results obtained:

*Table I.—Tensile properties of poly-(2,6-dimethyl-1,4-phenylene)-oxide film*

| Film Sample | Tensile stress, p.s.i. | | Elongation at break, percent |
|---|---|---|---|
| | Yield | Ultimate | |
| Extruded | 9,800 | 9,700 | 95 |
| Cross-linked | 11,460 | 9,400 | 16 |
| Chloroform treated | 6,000 | 7,400 | 120 |

From the above table, it is apparent that cross-linking of the film caused embrittlement but subsequent immersion in the chloroform again increased ductility as evidenced by the 120 percent elongation to break.

EXAMPLE 3

In this example, the chloroform treated film of Examle 1, and the extruded and chloroform treated film of Example 2 were tested for initial crazing in gasoline. To determine craze resistance, a plurality of horizontal circular mandrels having diameters ranging from large to small are used. The specimen to be tested is cut into a number of thin strips. Tests are made beginning with the largest diameter mandrel. A strip of film is clamped over the mandrel. This causes elongation along the top surface of the film. The mandrel with the film is then exposed to an aggressive solvent and examined for crazing. If no crazing is induced, a smaller diameter mandrel is employed and the procedure repeated. Testing is continued with successively smaller mandrels until crazing is observed. The percent elongation of the sample along the top surface of the film wherein crazing occurs is recorded. The following results were obtained:

*Table II.—Craze resistance of poly-(2,6-dimethyl-1,4-phenylene)-oxide*

Film sample: Craze resistance (critical elongation percent) [1]
Extruded _____ 0.34
Extruded; oxidized 3 hours at 200° C.; immersed in chloroform and dried _____ 1.90
Extruded; oxidized 6 hours at 200° C.; immersed in chloroform and dried _____ >3.00

[1] Represents an average of 3 samples.

From the above table, it is readily seen that great improvements in craze resistance are realized by following the process of this invention. The film which was oxidized 6 hours at 200° C. and immersed in chloroform showed no crazing when creased in gasoline.

EXAMPLE 4

A 5 mil film was prepared by dissolving sufficient poly-(2,6-dimethyl-1,4-phenylene)-oxide having an intrinsic viscosity of 0.60 dl./g. as measured in chloroform at 30° C. to form an 18 percent, by weight, solution of polymer in chloroform. The solution was solvent cast on a glass casting table and the film was allowed to dry for one hour. Thereafter, the film was removed from the glass using a water release agent and dried in an air circulating oven maintained at 95 to 100° C. for 15 hours. The so-cast film was then cut into 3 samples. One sample was exposed to an X-ray dose of 22 mega roentgens. A second sample was exposed to a X-ray dose in excess of 110 mega roentgens. The third sample was not exposed. The 3 samples were then immersed in chloroform. The sample that was not exposed to the X-ray dosage was completely dissolved in the chloroform. The sample exposed to 22 mega roentgens was approximately 25 percent insoluble. The sample exposed to an excess of 110 mega roentgens was essentially insoluble but substantially swollen. This latter sample was removed from the chloroform solution after immersion for approximately one minute and dried in an air circulating oven maintained at a temperature of between 95 and 100° C. for 8 hours. Using the procedure of Example 3, critical elongations for initial crazing in a heptane environment were compared for this material and the original cast film. The original film was found to have a critical elongation of approximately 0.45 percent while the undissolved radiated solvent-treated film had a critical elongation for initial crazing of approximately 0.85 percent. It is thus clear that the radiated and subsequently swollen film showed considerable improvement over the untreated film.

EXAMPLE 5

In this example, a film of poly-(2,6-dimethyl-1,4-phenylene)-oxide having an intrinsic viscosity of 0.60 dl./g. as measured in chloroform at 30° C. was extruded to form a 10 mil film. This film was subjected to intense ultraviolet radiation in air. The exact dose was not determined, but the sample was held about 10 centimeters from a sun lamp for 24 hours. The film was turned over every 2 hours. The cross-linked material was immersed in chloroform. No dissolution of the film took place, but the film was 80 percent swollen. The film was then clamped and dried in its stretched, swollen configuration in a circulating air oven maintained at 90 to 100° C. for 8 hours.

After drying, the film was found to have a critical elongation for initial crazing in gasoline of greater than 1 percent as compared with 0.35 percent for the original extruded film. Again, it can be seen that the treatment of the film in accordance with the process of this invention greatly increases the craze resistance of the film.

EXAMPLE 6

A film was prepared by blending a mixture of 2 parts poly-(2,6-dimethyl-1,4-phenylene)-oxide and 1 part unsubstituted polystyrene followed by passing the blend through an extruder. The extruded film was 2 mils thick. Two samples were cut from the film. One was heated in an air circulating oven maintained at 180° C. for 15 hours. Thereafter, it was immersed in chloroform for about 2 minutes. It swelled to over 200 percent of its original area. It was then taped to a backing plate and dried under vacuum at 110° C. for 4 hours. Critical elongations were measured for the original film and the treated film. The original film had a critical elongation for initial crazing in heptane of less than 0.4 percent while the treated film had a corresponding value of greater than 1 percent.

EXAMPLE 7

A two mil film of poly-(2,6-diphenyl-1,4-phenylene)-oxide was cross-linked by heating in air for 30 hours at 500° F. The sample was subsequently immersed in chloroform and swollen to approximately 200 percent of its original area. Thereafter, the film was removed from the chloroform, secured at its edges and dried at 212° F. for 8 hours.

EXAMPLE 8

A two mil film of poly-(2,6-diphenyl-1,4-phenylene)-oxide was cross-linked by heating in air for 1 hour at 600° F. The sample was subsequently immersed in chloroform and swollen to approximately 200 percent of its original area. Thereafter, the film was removed from the chloroform, secured at its edges and dried at 212° F. for 8 hours.

It should, of course, be apparent to those skilled in the art that changes may be made in the particular embodiments of the invention described which are within the full intent and scope of the invention as defined by the appended claims. For example, the film subjected to the cross-linking and solvent action may contain polymers in addition to polyphenylene oxide and polystyrene. For example, the films formed from polyblends of polyphenylene oxide and polyolefins are also applicable to the process contained herein.

What I claim as new and desire to secure by Letters Patent of the United States is:

1. A process for forming a craze resistant, ductile polyphenylene oxide film which comprises the steps of:
    (a) cross-linking the polyphenylene oxide
    (b) contacting the cross-linked polyphenylene oxide film with a dilatant capable of causing said film to swell without dissolving
    (c) removing the swollen polyphenylene oxide film from contact with said dilatant
    (d) securing said film at its edges to prevent shrinkage during drying, and
    (e) drying said film.

2. The process of claim 1 wherein the polyphenylene oxide film is cross-linked by exposing the film to an oxidizing atmosphere at elevated temperatures.

3. The process of claim 1 wherein the polyphenylene oxide is cross-linked by exposing the film to high energy radiation in an oxidizing atmosphere.

4. The process of claim 1 wherein the polyphenylene oxide film is cross-linked by incorporating an oxidizing agent in the film and exposing the film to elevated temperatures.

5. The process of claim 1 wherein all of the dimensions of the polyphenylene oxide film are increased by at least 50 percent by the action of the dilatant.

6. The process of claim 1 wherein all of the dimensions of the polyphenylene oxide film are increased by at least 100 percent by the action of the dilatant.

7. The process of claim 1 wherein the dilatant is chloroform.

8. The process of claim 1 wherein the dilatant is methylene chloride.

9. The process of claim 1 wherein the polyphenylene oxide is poly-(2,6-dimethyl-1,4-phenylene)-oxide.

10. A ductile, craze resistant polyphenylene oxide film formed by the process of claim 1.

11. The film of claim 10 wherein the polyphenylene oxide is poly-(2,6-dimethyl-1,4-phenylene)-oxide.

12. The film of claim 10 wherein the polyphenylene oxide is poly-(2,6-diphenyl-1,4-phenylene)-oxide.

13. A process for forming a craze resistant, ductile film from a blend of a polymeric composition consisting of a polyphenylene oxide and a polystyrene which comprises the steps of:
    (a) forming a film from said polymeric composition
    (b) cross-linking the polymeric components of said film
    (c) contacting the film with a dilatant capable of causing said film to swell without dissolving
    (d) removing the swollen film from contact with said dilatant
    (e) securing said film at its edges to prevent shrinkage during drying
    (f) drying said film 14. The process of claim 13 wherein the polystyrene constitutes from 1 to 35 percent, by weight, of the total polymeric composition.

15. The process of claim 13 wherein the polymeric film is cross-linked by exposing the film to an oxidizing atmosphere at elevated temperatures.

16. The process of claim 13 wherein the film is cross-linked by exposing the film to high energy radiation in an oxidizing atmosphere.

17. The process of claim 13 wherein all of the dimensions of the polymeric film are increased by at least 100 percent by the action of the dilatant.

18. The process of claim 13 wherein the polyphenylene oxide component of the polymeric composition is poly-(2,6-dimethyl-1,4-phenylene)-oxide.

19. The ductile, craze resistant polymeric film formed by the process of claim 13.

20. The film of claim 19 wherein the polyphenylene oxide component of the polymeric composition is poly-(2,6-dimethyl-1,4-phenylene)-oxide.

21. The film of claim 19 wherein the polyphenylene oxide is poly-(2,6-diphenyl-1,4-phenylene)-oxide.

References Cited

UNITED STATES PATENTS

| | | | |
|---|---|---|---|
| 3,134,753 | 5/1964 | Kwiatek | 260—47 |
| 3,217,076 | 11/1965 | Kun | 264—232 |
| 3,234,183 | 2/1966 | Hay | 260—47 |

MURRAY TILLMAN, *Primary Examiner.*

M. J. TULLY, *Assistant Examiner.*